June 2, 1953 D. P. INGLE 2,640,868
MAGNETIC FOCUSING DEVICE FOR CATHODE-RAY TUBES
Filed Nov. 4, 1950 2 Sheets-Sheet 2

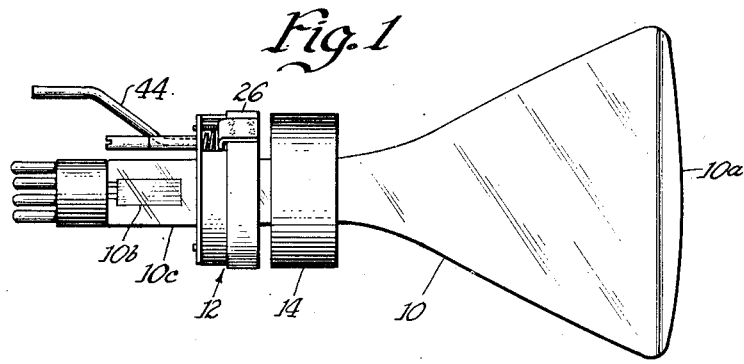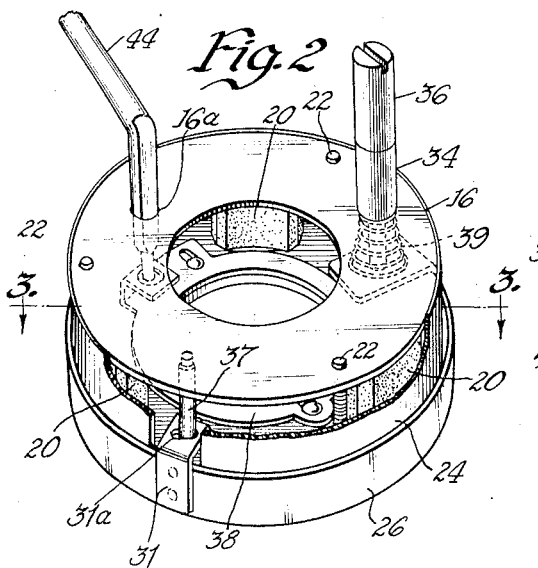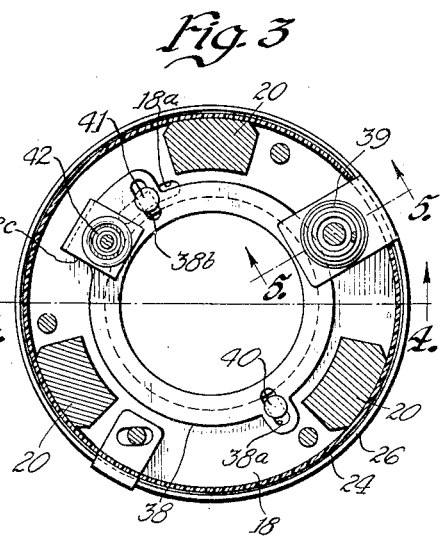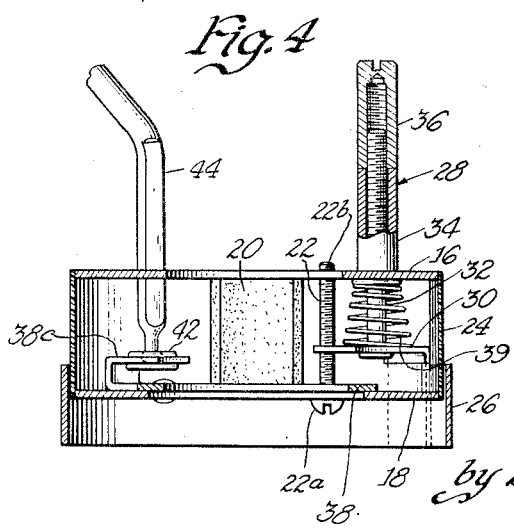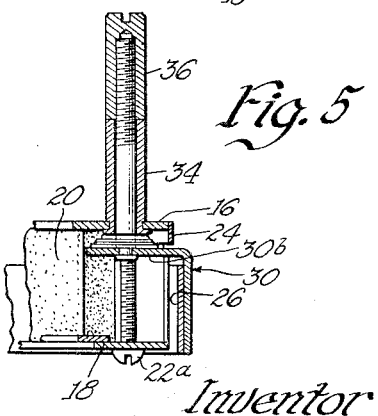

Inventor
D. Paul Ingle
by Bair, Freeman & Molinare
Attorneys

Patented June 2, 1953

2,640,868

UNITED STATES PATENT OFFICE 2,640,868

MAGNETIC FOCUSING DEVICE FOR CATHODE-RAY TUBES

Donald Paul Ingle, Defiance, Ohio, assignor to All Star Products, Inc., Defiance, Ohio, a corporation of Ohio Application November 4, 1950, Serial No. 194,097

3 Claims. (Cl. 175—21)

My invention relates to an improved focusing device for cathode ray tubes or the like characterized by effective utilization of magnetic materials, ability to operate close to the tube cathode, and low cost.

The electron streams of cathode ray tubes are frequently focused in part by the use of a magnetic lens defined by an axial magnetic field along a portion of the neck of the tube. This field acts to direct the electron stream in a beam to a point of focus on the remote viewing screen. The beam traverses the screen in a manner determined by the electric or magnetic deflecting means provided for the purpose.

Permanent magnet type magnetic focusing devices are particularly desirable for cathode ray tubes because they do not impose further D.-C. power requirements on the power supply, are not subject to line voltage variations, and they do not introduce an additional heating source near the cathode ray tube. However, these devices require the use of movable elements, such as shunting sleeves and magnetic centering discs, to control the intensity and disposition of the magnetic field for most effective focusing. In practical applications, such as television receivers, it is necessary to design these movable elements in such manner that they may be readily and accurately adjusted by means accessible from outside the unit.

Magnetic focusing devices have further been subject to the substantial disadvantage that they introduce a certain degree of defocusing as the beam is deflected. That is, if the field is adjusted for good focusing at one position, it will become defocused when deflected from that position to impinge upon a different point on the viewing screen. This problem can be overcome by placing the focusing field very close to the cathode of the tube as in this position the ray beam is focused as a pencil of parallel streams with minimum variation in the cross-section along its length, as distinguished from a pointed ray beam of conical shape and substantial longitudinal variation in cross-section. However, it has heretofore been considered that limitations in available permanent magnet materials preclude obtaining the field strengths considered necessary to focus a ray beam at a point close to the cathode.

In accordance with the present invention, the foregoing problems are overcome and an inexpensive, easily focused and efficient magnetic focusing device is provided which can be placed close to the cathode of a cathode ray tube and thereby focus with a minimum degree of deflection defocusing. Briefly, the apparatus of the present invention comprises a pair of annular magnetic plates adapted to receive the neck of a cathode ray tube. The plates are held in spaced relation by a series of permanent magnets located near the outer peripheries thereof to define a cage. The magnets are of such length that the axial distance between the plates is at least equal to the diameters of the inner peripheries of the plates. This construction provides a magnetic field capable of focusing the cathode ray beam even if located close to the cathode of the tube. Moreover, the apparatus of the present invention incorporates a fiber guide sleeve encircling the cage defined by the plates and magnets and a focusing sleeve snugly but slideably fitted over the guide sleeve. The focusing sleeve has a protuberance extending radially inwardly which receives a lead screw anchored to one of the plates to adjust the sleeve axially of the cage. Concentricity of the focusing sleeve in relation to the cage is further assured by a guide stud affixed to one of the plates and over which a second protuberance on the guide sleeve fits. The unit further includes a centering plate affixed to one of the plates and capable of limited movement parallel thereto. The centering plate has a socket in registry with an opening in the other plate to receive a rod for moving the centering sleeve at will.

It is, therefore, a general object of the present invention to provide an improved magnetic focusing device for a cathode ray tube.

Another object of the present invention is to provide an improved permanent magnet focusing device using a magnetic shunting sleeve and wherein the shunting sleeve is adjustably positioned by a lead screw in engagement with a single point thereon.

A further object of the present invention is to provide an improved focusing device including a centering plate that can be adjusted by a simple detachable control rod.

An additional object of the present invention is to provide an improved permanent magnet cathode ray tube focusing device using a slideable sleeve which may be mounted so that the sleeve slides towards the sweep coil and away from the ion trap.

Yet another object of the present invention is to provide an improved permanent magnet focusing device for a cathode ray tube capable of effectively focusing an electron stream even though placed near the cathode of the tube.

Another object of the invention is to provide an improved permanent magnet focusing device for a cathode ray tube having a slideable adjusting sleeve supported at a single point for adjustable axial movement but yet not subject to defocusing eccentric rotational movements under the action of the magnets.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which:

Figure 1 is a side elevational view of a cathode ray tube with the focusing device of the present invention received over its neck portion;

Figure 2 is a view of the focusing device of the present invention in perspective;

Figure 3 is a cross-sectional view through axis 3—3 of Figure 2;

Figure 4 is a cross-sectional view through axis 4—4 of Figure 3, showing the adjusting sleeve in one position of adjustment;

Figure 5 is a fragmentary view like Figure 4 but showing the adjusting sleeve in another position of adjustment; and, Figure 6 is an exploded view of the apparatus of Figures 2 to 5.

Figure 6:
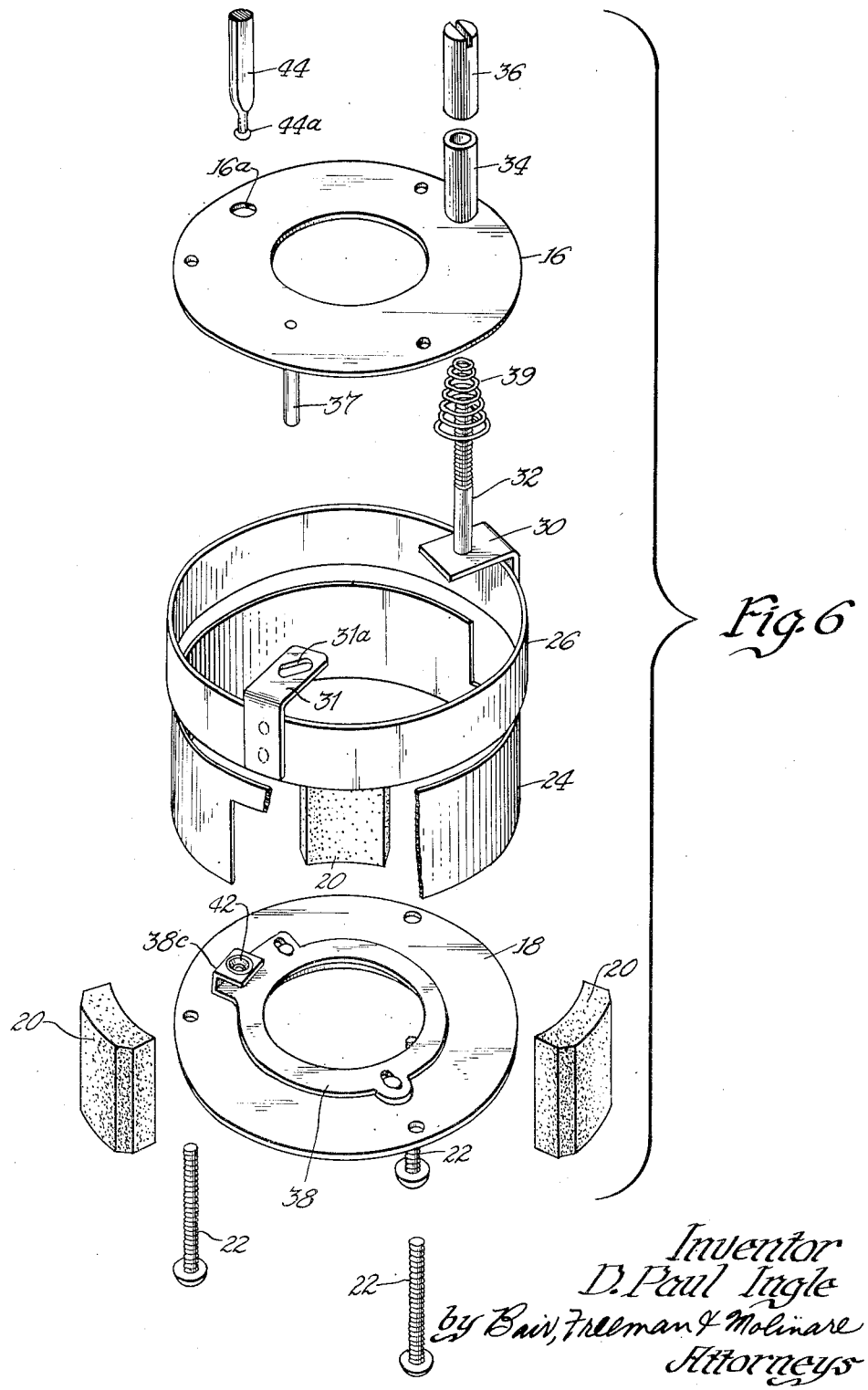

Referring now to Figure 1, there is shown at 10 a cathode ray tube, such as a television picture tube, having a viewing screen 10a and an electron gun 10b. Suitable means (not shown) are provided in electron gun 10b to produce a supply of electrons and to propel the same toward the viewing screen 10a. It is the function of the apparatus of the present invention, which is received over the neck portion 10c of tube 10 and indicated generally at 12, to focus the electron stream issuing from gun 10b to a pencil-like beam of electrons which impinge on the viewing screen 10a at a point of small size to produce a small area of illumination. In television reception, the electron beam as so focused is scanned in a systematic manner across the viewing screen 10a by suitable ray deflecting means, such as the magnetic sweep coil indicated at 14, Figure 1.

The focusing device 12 is shown in detail in Figures 2 to 6. It consists of a pair of parallel spaced annular plates 16 and 18, plate 16 being a top plate and plate 18 being a bottom plate. These plates are of mild steel or similar magnetic material. Three permanent magnets 20 of suitable material are disposed at 120° spaced positions about the plates 16 and 18 and near the outer peripheries thereof, as shown at Figure 3. These magnets are of arcuate segmental shape to conform to the curvature of the plates. The magnets are oriented with their north poles adjacent one plate and their south poles adjacent the other plate so as to establish a magnetic field between the inner edges of the plates and extending axially thereof. When the focusing device is positioned on the cathode ray tube as shown in Figure 1, the magnetic field between the inner peripheries of the plates is in the axial direction in relation to the neck portion 10c of the tube.

The magnets 20 are of any suitable magnetic material. Preferably magnetic alloys of the iron-nickel-aluminum type are used since these possess the property of great resistance to magnetic change by stray fields, vibration or temperature. One alloy suitable for this purpose is Alnico V and has a composition of 14% nickel, 8% aluminum, 24% cobalt, 3% copper and the balance iron.

As shown in Figure 4, the magnets 20 are sandwiched between the plates 16 and 18. The unit is further secured together by a plurality of screws 22 which at their head portions 22a seat on plate 18 and at their tail portions 22b, Figure 4, are threadedly received in plate 16.

A jacket or sleeve 24 is received about the cage defined by the plates 16 and 18 and the magnets 20. This jacket is of non-magnetic material, such as heavy cardboard fiber. A shunting sleeve 26 of mild steel or other magnetic material is received about the sleeve 24 in a fairly snug but easily slidable fit. When this sleeve is in the full telescoping position of Figure 5, it carries much of the flux of magnets 20 between the plates 16 and 18, thereby reducing the flux extending between the inner peripheries of these plates which flux forms the magnetic field which exerts a focusing effect on the electron beam issuing from gun 10b of Figure 1.

When the sleeve 26 is in the extended position of Figure 4, it does not define this shunting flux path and exerts no substantial influence on the flux between the inner peripheries of the plates 16 and 18 which focus the electron beam.

In accordance with the present invention, the shunting sleeve 26 is axially adjusted for focusing control by the lead screw mechanism indicated generally at 28 of Figure 4, which coacts with the inwardly extending platform or protuberance 30 attached to sleeve 26. The protuberance 30 is formed by an L-shaped member which is spot-welded along face 30a (or drawn from sleeve 26) of Figure 5, to the sleeve 26 so that the other face 30b of Figure 5, extends into the space between plates 16 and 18. A threaded post 32 is attached by peening or similar means to the platform portion 30b and extends through the plate 16 as shown in Figures 4 and 5. A sleeve 34 is similarly peened or otherwise attached to the plate 16 and receives the post 32 as shown. A threaded cap 36 seats on the end of sleeve 34 and threadedly receives the end portion of the post 32. The cap 36 is held in seated position against the end of sleeve 34 by the compression spring 39.

An auxiliary L-shaped member 31 is attached to sleeve 26 in similar fashion to member 30 but in spaced relation to the member 30. Member 31 has an opening 31a which receives the axially oriented stud 37 to hold the sleeve 26 concentric with the plates 16 and 18. Stud 37 is attached to the plate 16 by peening or similar means and terminates in spaced relation to the plate 18.

The telescoping position of sleeve 26 is adjustable by rotating the cap 36 to vary the spacing between the platform 30b and the plate 16. I have found that this adjustment is effected without binding and without any tendency of the sleeve 26 to snap to an eccentric position against one of the magnets 20 by reason of its proximity to those magnets. This tendency of the sleeve is greatly reduced by the provision of the non-magnetic spacer guide sleeve 24 which holds the magnetic sleeve 26 to at least some spacing from the magnets 20 and by the guide stud or post 37 which extends loosely through member 31 to maintain the concentricity of sleeve 26 and the magnetic cage.

Centering of the ray beam is accomplished by the annular centering plate or disc 38 of Figure 3. This plate is made of mild steel or similar magnetic material and is of somewhat smaller inner diameter than the plate 18. It is attached to plate 18 for movement parallel thereto but in any direction by the rivets 40 and 42 of Figure 3. Rivet 40 is fixedly attached to plate 18 and rides in the elongated slot 38a of plate 38 to permit radial in-and-out motion of that portion of plate 38. Rivet 42 rides in a similar elongated radial slot 38b in plate 38 and in a circumferential elongated slot 18a of plate 18. This rivet permits both radial in-and-out motion of the plate 38 and circumferential motion. Adjacent the slot 38b, the plate 38 has a low, flat U-shaped, over-hanging portion 38c which has an opening to receive the loose rivet-like socket 42. This socket is loosely received on portion 38c of the plate 38 to form a bearing. As shown in Figure 2, the plate 16 has an opening 16a located in substantial registry with the portion 38c of plate 38. This opening receives the head at end portion 44a of the adjusting arm 44.

When the adjusting arm 44 is in the inserted position as shown in Figures 2 and 4, it may be rocked to shift the centering plate 38 in any direction in relation to plate 18. This controls the disposition of the magnetic field between the inner peripheries of plates 16 and 18 to center the ray beam at the desired point on the viewing screen 10a of Figure 1. It will be understood, of course, that the inner periphery of plate 18 referred to above is in reality the inner periphery of centering plate 38, since it is the latter periphery that controls the location of the magnetic field.

The apparatus of the present invention is simple in construction and amenable to mass production for use in television receivers. No precision parts are required and spot-welding and similar assembly operations can be applied without difficulty. Moreover, shunting sleeve 26, despite the fact that it is adjusted from the platform 30b only, nevertheless moves without binding and without snapping into position against one of the magnets or another.

The structure of the present invention is particularly suitable for use when mounted adjacent the electron gun of the cathode ray tube as shown in Figure 1. In this position the deflection defocusing incident to the action of the sweep coil 14 (or other ray deflecting means) is minimized so that the ray beam maintains its focused condition to a maximum degree. Heretofore it has been considered necessary in the case of permanent magnet focusing devices to mount them at some distance from the cathode ray tube gun 10b and to provide a rather short intense magnetic field, as otherwise it has been considered impossible to utilize the magnetic material efficiently. However, in the apparatus of the present invention the distance between the plates 16 and 18 substantially exceeds the inner radius of plate 16 and the inner radius of plate 18 is modified by plate 38, and it has been found that with this construction the ray beam is effectively focused and yet the magnetic materials are efficiently utilized.

The guide stud 27 aids in maintaining the concentricity of the sleeve 26 over the cage defined by rings 16 and 18 and magnets 20. If, however, a sharp blow is delivered against this sleeve, such as during handling or shipping, the sleeve can distort and may assume to a non-round configuration. Such distortion is largely prevented by the insulating sleeve 24 and if, nevertheless, distortion does take place, the magnetic sleeve 26 is at at least some spacing in relation to the magnets. This supplementary action of the sleeve 24 avoids the eccentricities that could result from sharp blows during handling or shipping and limits their undesirable effects.

The structure of the present invention may be mounted as shown in Figure 1 so that the sleeve 26 moves toward the sweep coil 14 in the withdrawn position. This has the advantage of minimizing interference with the ion trap (located adjacent the base of tube 10) and avoiding the astigmatism otherwise associated with the field at the sleeve.

While I have shown and described a specific embodiment of the present invention, it will, of course, be understood that any modifications and alternative constructions can be made without departing from the true spirit and scope thereof. I, therefore, intend by the appended claims to cover all such alternative constructions as fall within the true spirit and scope thereof.

What I claim as new and desire to secure by Letters Patent of the United States is:

1. An adjustable permanent magnet focusing device for a cathode ray tube or the like comprising in combination, a pair of substantially flat magnetic annular plates adapted to receive the neck of a cathode ray tube, a plurality of permanent magnets interposed between the plates and disposed near the outer peripheries thereof to define a cage, a guide stud affixed to one plate and aligned with the axis thereof, an axially shiftable magnetic shunting sleeve surrounding the cage in a snug but slideable fit and having a portion slideably receiving the stud, and a lead screw mechanism anchored to the shunting sleeve and one annular plate at a single point spaced from the stud and operable to shift the shunting sleeve axially.

2. An adjustable permanent magnet focusing device for a cathode ray tube or the like comprising in combination, a pair of substantially flat magnetic annular plates adapted to receive the neck of a cathode ray tube, a plurality of permanent magnets interposed between the plates and disposed near the outer peripheries thereof to define a cage, a guide stud affixed to one plate and aligned with the axis thereof, an axially shiftable magnetic shunting sleeve having a portion extending radially inwardly with an opening slideably receiving the stud, the shunting sleeve having a protuberance extending into the space defined by the plates and carrying a threaded post extending axially through one of the plates, a threaded cap received by the post and bottoming against said one plate, and a compression spring seated against the protuberance and said one plate.

3. An adjustable permanent magnet focusing device for a cathode ray tube or the like, comprising in combination a pair of substantially flat magnetic annular plates adapted to receive the neck of a cathode ray tube, a plurality of permanent magnets interposed between the plates and disposed near the outer peripheries thereof to define a cage, a guide stud affixed to one plate and aligned with the axis thereof, a non-magnetic guide sleeve encircling the plates and the magnets, an axially shiftable magnetic shunting sleeve surrounding the guide sleeve in a snug but slidable fit and having a portion slidably receiving the stud, and a lead screw mechanism anchored to the shunting sleeve and one annular plate at a single point spaced from the stud and operable to shift the shunting sleeve axially.

D. PAUL INGLE.

References Cited in the file of this patent

UNITED STATES PATENTS

| Number | Name | Date |
|---|---|---|
| 2,305,761 | Borries et al. | Dec. 22, 1942 |
| 2,416,687 | Fry | Mar. 4, 1947 |
| 2,440,403 | Jackson | Apr. 27, 1948 |
| 2,533,687 | Quam | Dec. 12, 1950 |
| 2,533,688 | Quam | Dec. 12, 1950 |
| 2,533,689 | Quam | Dec. 12, 1950 |
| 2,568,668 | Steers | Sept. 18, 1951 |
| 2,581,657 | Heppner | Jan. 8, 1952 |
| 2,591,820 | Jackson | Apr. 8, 1952 |
| 2,608,665 | Parker | Aug. 26, 1952 |